Patented Apr. 7, 1936

2,036,274

UNITED STATES PATENT OFFICE 2,036,274

INSULATING LIQUID

Homer D. Holler, Wilkinsburg, Pa., assignor to Westinghouse Electric & Manufacturing Company, East Pittsburgh, Pa., a corporation of Pennsylvania No Drawing. Application November 27, 1934, Serial No. 755,073

6 Claims. (Cl. 252—1)

This invention relates to insulating liquids and particularly to the control of the acidity of halogenated hydrocarbon insulating liquids.

Halogenated hydrocarbon liquids are employed as insulating liquids in different electrical apparatus and particularly in transformers. It has been found, however, that certain disadvantages develop when such liquids are employed. When a halogenated liquid has been in use or exposed to light, there is auto-decomposition of the halogenated hydrocarbons and free acid is produced. This acid attacks the exposed conductor terminals submerged in the liquid, causing corrosion and other detrimental effects. Further, the resistivity of the insulating liquid is lowered reducing the value of the liquid as an insulating medium. Instances are known where the acid produced in the halogenated liquid by an exposure to light has decreased the resistivity of the liquid to less than one-tenth of the value it had before exposure to light. It is, therefore, desirable to produce an insulating liquid in which the acid produced on decomposition will be neutralized and which will retain its high resistivity.

An object of this invention is to produce a halogenated hydrocarbon insulating liquid which contains a compound capable of neutralizing acids produced on decomposition of the liquid.

In order to neutralize acids such as hydrocloric acid produced by the decomposition of halogenated hydrocarbons, a compound is added to the liquid which will remain in suspension in the liquid and which will react with the acids formed on decomposition. Numerous neutralizers may be employed and satisfactory results may be secured by adding oxides, carbonates or hydroxides to the different halogenated hydrocarbon insulating liquids. Zinc oxide, lithium carbonate, magnesium carbonate (hydrated), magnesium oxide, calcium carbonate and calcium oxide, are some of the compounds which are suitable to be employed as acid neutralizers in the halogenated liquids.

Zinc oxide is a neutral and substantially insoluble compound and when added to a halogenated hydrocarbon insulating liquid, it maintains the liquid near the neutral point and possibly a little on the alkaline side. The zinc oxide maintains the insulating liquid neutral when exposed to light or to contaminating impurities. No perceptible detrimental effect is noticed upon the resistivity of the liquid even when more than enough of zinc oxide is added to the halogenated liquid than is necessary to react with and neutralize the acids produced on decomposition.

The use of zinc oxide as an acid neutralizer makes possible the use of some of the more common halogen substitution hydrocarbons or the combination of two or more of the common halogenated hydrocarbons without a substantial decrease in the breakdown voltage resistance of the liquid as long as the hydrocarbons are stable in air and at high temperatures. Pentachlorethane ($CCl_3.CHCl_2$) or a mixture consisting of 10% of pentachlorethane and 90% of trichlorbenzene with zinc oxide in suspension has a very high resistivity while the temperature coefficient is negligible over the range of operating temperatures from 25° centigrade to 100° centigrade.

Other acid neutralizers, as indicated hereinbefore, are suitable for use in halogenated hydrocarbons. The choice of the acid neutralizer is controlled by the halogenated hydrocarbon with which it is to be employed for it is preferable to employ a neutralizer which has approximately the same specific gravity as the liquid. Thus, for example, it is desirable, although not essential, that magnesium carbonate (hydrated) be employed as the acid neutralizer of pentachlorethane, since they both have a specific gravity approximating 1.85. Other conditions such as temperature, humidity, convection currents, initial expenditure and supply also have a bearing on the selection of the acid neutralizer.

Different combinations of halogenated hydrocarbons and acid neutralizers have been tested and it appears that generally zinc oxide is quite satisfactory as the acid neutralizer. Tests of the conductance of different halogenated liquids at the end of one week of exposure to light compared with the same halogenated liquid to which zinc oxide is added indicate the improvement in the liquid by the addition of the acid neutralizer.

Some of the halogenated liquids tested and the results obtained after one week of exposure are as follows: The addition of zinc oxide to tetrachlordifluoroethane decreases the conductance of the liquid to about .9% of the conductance of a similar liquid which has no acid neutralizer addition. Similarly, the conductance of an insulating liquid comprising a mixture of 10% of tetrachlordifluoroethane and 90% of trichlorbenzene and zinc oxide addition was reduced to about 50% of the value of the same insulating liquid to which no acid neutralizer was added. The conductance of a liquid comprising 90% of trichlorbenzene and 10% of pentachlorethane and zinc oxide addition was reduced to about 75% of that of the same liquid without an acid neutralizer. When zinc oxide is added to pentachlorethane, the conductance of the liquid is only about 37% of the conductance of pentachlorethane where no acid neutralizer is employed. Similar results may be obtained where the acid neutralizer is employed with other halogenated hydrocarbons. In all cases, the conductance of the liquid is materially decreased by the addition of the acid neutralizer.

It is thus evident that, by the addition of an acid neutralizer to the halogenated hydrocarbon insulating liquids, an improved insulating medium is secured and that the different neutralizers may be effectively employed.

It is, of course, to be understood that various modifications may be made in the composition and constituents of the insulating liquids and acid neutralizers added thereto, as above described, without in any way departing from the spirit of the invention as set forth in the appended claims.

I claim as my invention:

1. An insulating liquid comprising a halogenated hydrocarbon and a zinc oxide addition in suspension in the liquid as an acid neutralizer.

2. An insulating liquid comprising trichlorbenzene and tetrachlordifluoroethane to which zinc oxide has been added as an acid neutralizer.

3. An insulating liquid comprising trichlorbenzene, pentachlorethane and a zinc oxide addition in suspension in the liquid as an acid neutralizer.

4. An insulating liquid comprising trichlorbenzene tetrachlordifluoroethane and a zinc oxide addition in suspension in the liquid as an acid neutralizer.

5. An insulating liquid comprising trichlorbenzene and a zinc oxide addition in suspension in the liquid as an acid neutralizer.

6. An insulating liquid comprising a halogenated hydrocarbon and more than enough of a zinc oxide addition in suspension in the liquid to react with the acids produced by the decomposition of the halogenated hydrocarbon and to maintain the liquid in a neutral or alkaline condition.

HOMER D. HOLLER.